March 6, 1956 B. GROSS 2,737,266
STRUCTURES WHICH REQUIRE HERMETICAL SEALING
Filed Feb. 16, 1951 4 Sheets-Sheet 2
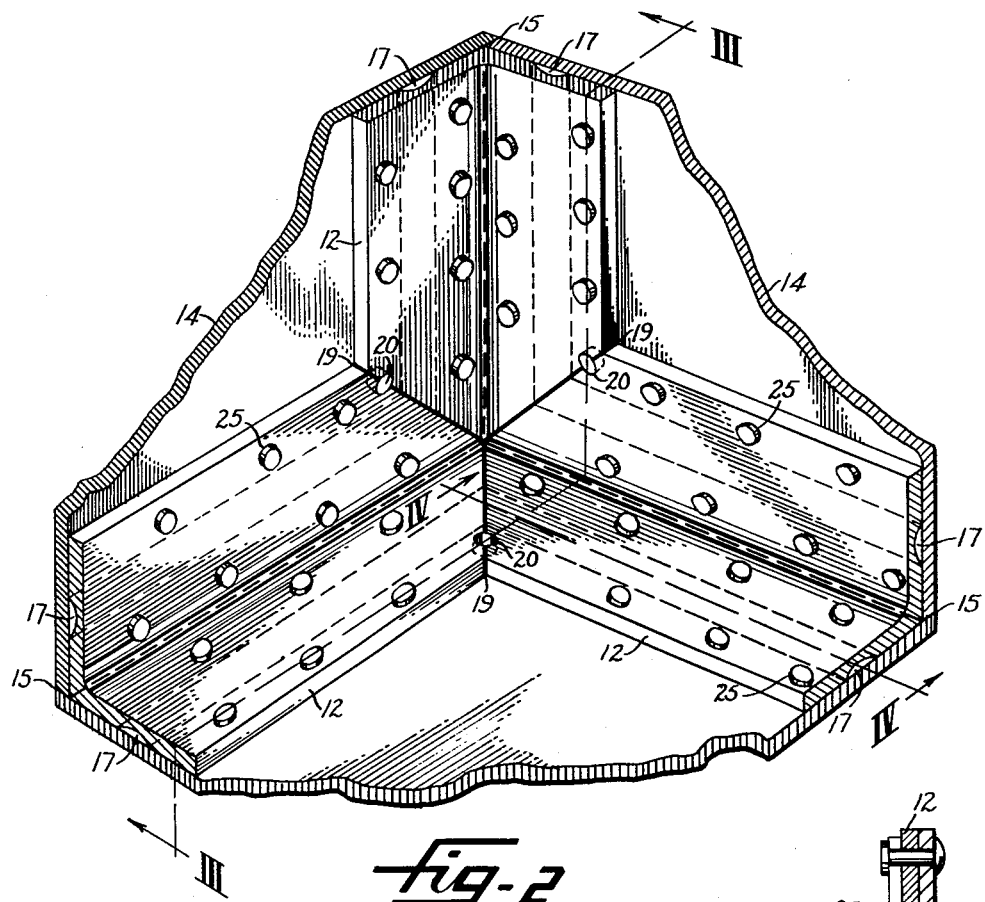
fig-2
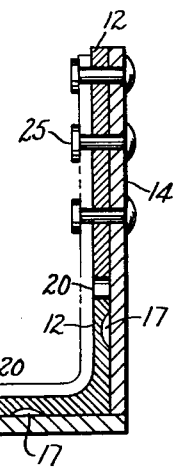
fig-3
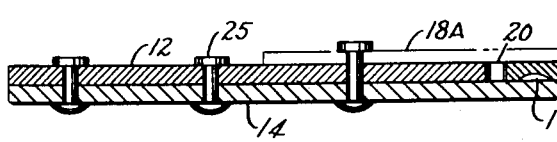
fig-4
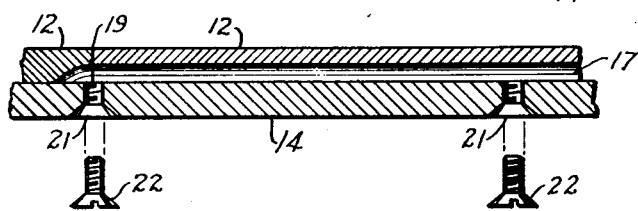
INVENTOR.
B. GROSS
BY Everett A. Curtis
ATTORNEY INVENTOR.
B. GROSS
BY Everett L. Curtis
ATTORNEY

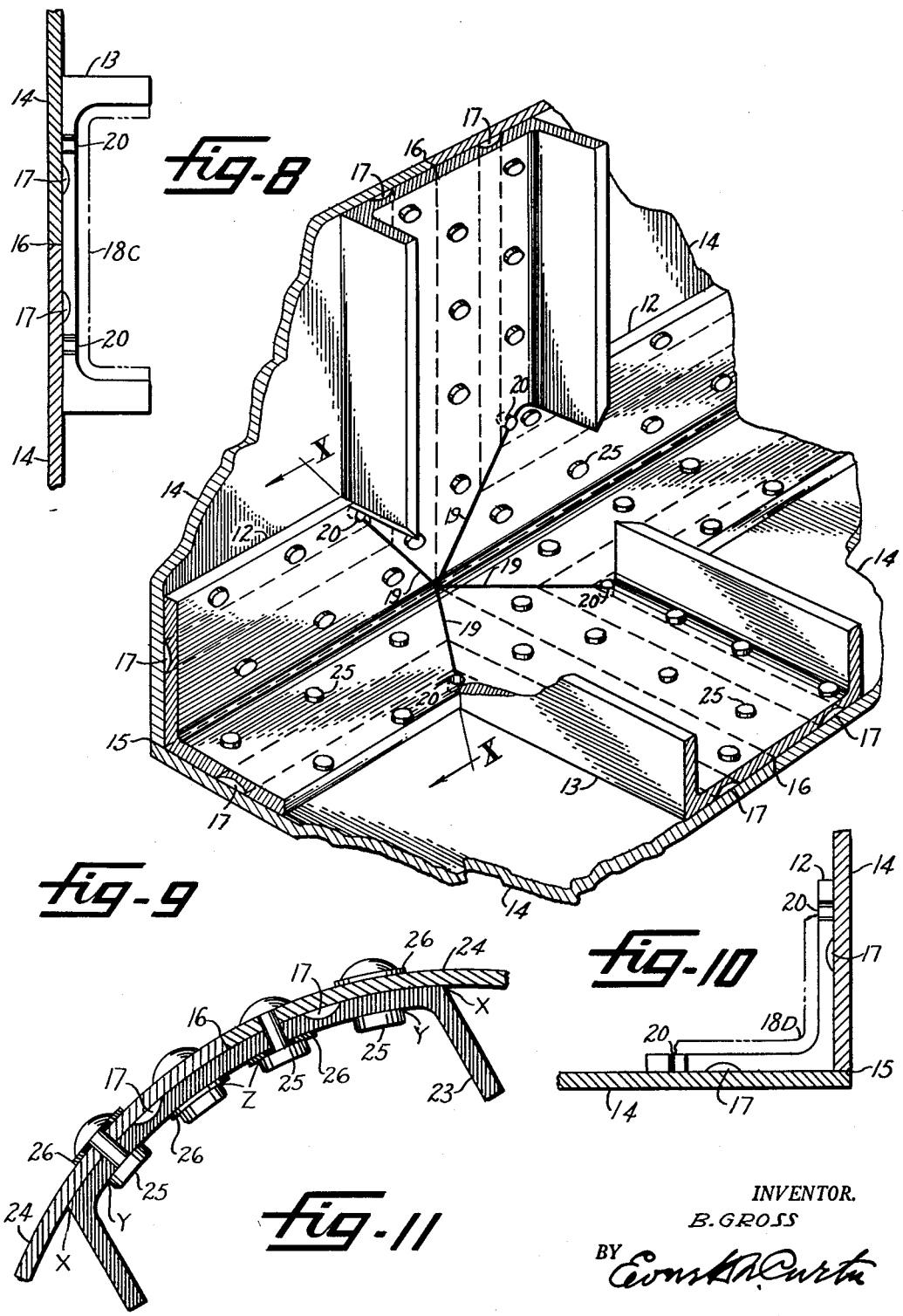

United States Patent Office 2,737,266
Patented Mar. 6, 1956

2,737,266
STRUCTURES WHICH REQUIRE HERMETICAL SEALING

Bernard Gross, San Diego, Calif., assignor to Rohr Aircraft Corporation, Chula Vista, Calif., a corporation of California Application February 16, 1951, Serial No. 211,375

2 Claims. (Cl. 189—34)

The invention relates to improvements in structures which require hermetical sealing and is particularly, although not necessarily, adapted to integral aircraft structures such as built-in fuel tanks, pressurized cabins, etc.

It is an object of this invention to provide a structure, the seams and joints of which may be sealed after assembly, and the seal replaced or repaired from the exterior without necessity of disassembly.

A more specific object is to adapt existing linear metallic structural stock such as I-beams, angles, channels, etc., to the above described purpose, without departing from the basic load carrying shapes of such stock.

Another object is to provide a structure which will maintain an effective seal under severe stress conditions such as are produced by weaving and vibration of aircraft during flight.

A further and more general object is to provide a hermetically sealable structure which is of relatively light weight and economical to fabricate and to maintain.

Other objects will appear in the description of my invention as hereinafter fully set forth, defined in the claims and illustrated in the accompanying drawings.

Most sheet metal structures of the covered framework type, such as are common in aircraft, are difficult to seal hermetically because of the complex joints and intersections of the frame members.

Presently, such structures are often sealed by such commonly known means as gasketing, interior surface coating, and the application of paste compounds.

Gasket type sealing is complicated in cases where seams in the outer covering of the structure coincide with those of the intersecting frame members, and is quite costly where repairs and maintenance are concerned, since disassembly of the structure is involved. Also, in the case of aircraft, rubber type gasketing materials tend to cold flow under the severe stresses caused by weaving of the airplane in flight, and a permanent uniform seal is not ensured thereby.

Interior surface coating is complicated by the presence of crevices and voids formed by the intersecting frame members, lap joints, gussets, etc. Such voids often entrap air, causing bubbles to form under the coating. Also, bubbles frequently are created in the body of the coating material, due to agitation of such material when it is being applied. Air bubbles, whether in the body of the sealing coat or trapped underneath, have a tendency to expand and burst at high altitudes causing rupture of the seal and subsequent leakage. The interior coating type seal is also unsatisfactory in aircraft applications because of the unnecessary weight involved, the entire inner surface of the structure having to be coated in order to obtain an unbroken sealing coat over the seams and joints.

Paste compounds applied to the seams and joints of a structure are likewise not entirely satisfactory in that the entrapment of air in crevices and voids is difficult to avoid, and the uniform application of such a seal depends largely upon skill of the operator, there being no positive method of controlling the mass of material used. Also, in the case of repairs, a certain amount of structural disassembly may be necessary to make the joints and seams accessible, especially in the case of fuel tanks built into the wings of aircraft.

In the case of either of the latter two types of seal, it is very difficult to ascertain the exact location of a leak. This is due to the fact that since both such seals are applied over whatever network of crevices may be present between the frame members of the structure, a leak may occur at one location and the fluid, such as gasoline or air for example, may travel along these crevices, making exit at one or more points some distance from the initial break. In such cases a proper repair may be exceedingly difficult to effect.

My invention has eliminated these problems in that the sealing material is entirely contained within grooves provided in the structural frame members, thereby forming a single boundary type seal around a given area, each such seal being accessible from the outside of the structure. These grooves are arranged to run longitudinally between the contacting surfaces of the frame members and the outer covering or skin members of the structure. The skin members are fastened to the frame members by any suitable well known means, preferably head and shank type fasteners such as rivets or bolts or by means of resistance welding. Where head and shank type fasteners are used, they are preferably sealed individually by means of the sealing device described in my earlier U. S. Patent No. 2,396,005. The pattern of the fastener locations at each sealing groove is described by two parallel lines, one on either side of the groove. This construction provides for positive metal to metal contact between the skin panels and frame members, thereby maintaining a constant and uniform pressure of the skin upon the area adjacent to the sealing groove. After assembly of the parts, sealing compound may be injected by any suitable well known means, such as a pressure gun, into the grooves through a plurality of ports located in the skin panels and arranged in rows corresponding longitudinally with the grooves thereunder. These injection ports are provided with removable plugs, preferably in the form of self-tapping screws having countersunk heads, the latter being especially desirable where the skin panel concerned represents a portion of an airplane's exterior surface. The screws are preferably somewhat longer than the thickness of the skin panel, their tip ends extending into the mass of sealing compound contained within the groove. This feature contemplates a frictional relationship between the threads of the screw and the sealing compound, thus ensuring permanent tightness during service.

An essential characteristic of my invention is that the sealing grooves provided in the linear structural stock are coordinately positioned in a manner which permits continuity of the seal across mitered intersections, whether such intersections involve members having similar or dissimilar cross sections. For example, where three members having identical right angular cross sections intersect to form a corner (as of a cube shaped structure), each sealing groove of a given said member will coincide with a corresponding sealing groove of another said member at the plane of the mitered cut. Likewise, where structural frame members having dissimilar cross sections come together at a mitered intersection the sealing grooves of one said member will each coincide with a corresponding sealing groove of the other said member. In all cases a clear and uninterrupted passageway extends across the mitered cut, permitting continuous flow of the sealing compound when the latter is injected under pressure. This coordinate positioning of sealing grooves throughout a variety of basic structural shapes, and the adaptability of each such shape made possible by such coordination is important in that the stock need simply be cut to length (in accordance with the desired miter angle), there being no necessity for specially machined grooves to connect the sealing grooves of one member with those of intersecting members.

The sealing grooves are provided in the linear structural stock preferably at its source of manufacture, and may be extruded, milled or press-formed in accordance with the method by which the material itself is formed into shape.

Essentially my invention consists in the construction, arrangement and combination of the various parts of my structure whereby the contemplated objects are attained.

The embodiment of my invention illustrated in the accompanying drawings is applied to sheet metal structure such as is typical in aircraft.

Figure 1 of the drawing is a perspective view shown partially in section, of a portion of a structure comprising several junctures designated A, B, C and D.

Figure 2 is an enlarged detail view of juncture A, shown partially in section, with a portion omitted for clarity.

Figure 3 is a sectional view of Figure 2 taken along the line III—III.

Figure 4 is an enlarged sectional view of Figure 2 taken along the line IV—IV.

Figure 8 is a sectional view of Figure 7 taken along the line VIII—VIII.

Figure 9 is an enlarged detail view of juncture D, shown partially in section, with a portion omitted for clarity.

Figure 10 is a sectional view of Figure 9 taken along the line X—X.

Figure 11 is a sectional view showing how the invention may be adapted to structures involving curved surfaces.

Figure 1:
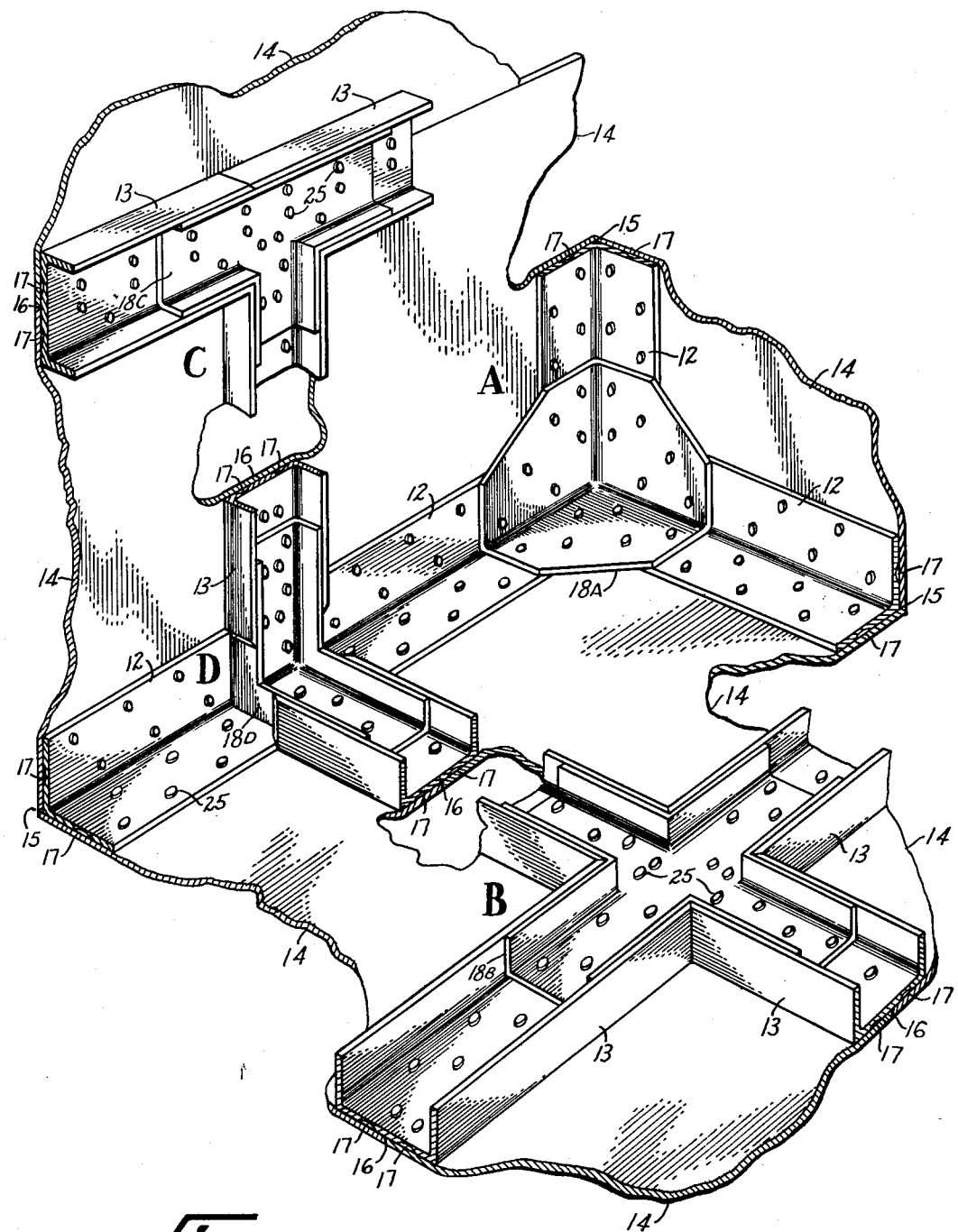

Referring to Figure 1, the structure shown comprises a framework composed of angle members 12 and channel members 13. Fastened to the outside of the framework are sheet metal panels 14 arranged in abutting relationship to form a portion of an enclosure. It may be seen that where the angle members are involved, seams 15 formed by the abutting edge surfaces of the panels lie immediately adjacent the heels of the angles, and in the caes of the channel members, seams 16 formed by the abutting edges of the panels lie at the center of the said channel members. This relationship of the panel seams to the frame members is common practice, well known in the art, and is here emphasized since the arrangement of my sealing grooves 17 with respect to such seams is a preferred construction. In angle members 12 the grooves 17 are provided in the outer surfaces, each groove being spaced outward from and parallel to the heel of the angle. In channel members 13 the grooves 17 are also provided in the outer surfaces, each groove being spaced outward from and parallel to the center line of the channel. It is important to note that in all cases, space is reserved on either side of each sealing groove for the rivets 25 which fasten panel members 14 to the framework. The pattern of the fastener locations with respect to grooves 17 follows a line on either side of and parallel to each said groove, as shown on the drawing. One set of spaced apart fasteners are arranged in alignment on one side or inwardly from a groove 17 while another set are arranged in alignment on the other side or outwardly from the same groove. Such an arrangement of the fasteners is important in that it affords positive metal to metal contact between the panel and frame members, thus ensuring a constant uniform pressure at the area of the sealing grooves. As is well known in the art, each juncture of intersecting frame members is covered by a reinforcement member, here designated 18A, 18B, 18C, and 18D respectively, in accordance with the juncture concerned. These reinforcements serve an added purpose in my invention, namely, that of retaining dam plugs (not shown in Figure 1) positioned within the miter cuts separating the adjoining frame members. These dam plugs serve to prevent escape of the injected sealing material through the miter cut and into the interior of the structure.

Referring to Figure 2, juncture A is shown with the reinforcement member 18A omitted for clarity. Sealing grooves 17 are shown in dash lines, each groove of a given angle member 12 communicating with a corresponding groove in an intersecting angle member across a miter cut 19. The dam plugs 20, positioned within the miter cuts, are preferably cylindrical in shape, having a common length substantially equal to the thickness of angle members 12. The plugs are installed in holes drilled through the miter cut, which said holes are preferably started with an ordinary drill bit and finished with a bottoming type bit, the latter being gaged to bottom upon reaching the surface of the adjacent panel 14. When the assembly is completed and rivets 25 driven, the plugs are held securely between the said panel 14 and the reinforcement member 18A as may be seen in Figure 3, the said member 18A being shown there in phantom lines.

Referring to Figure 4, the threaded injection ports 21, located in panel 14 are shown in communicating relationship with the sealing groove 17. A removable plug 22, which is preferably in the form of a standard self-tapping screw, is provided for each said injection port as shown. The length of the plug is preferably greater than the thickness of panel 14, enabling its tip to extend partially into the groove 17 and the mass of sealing compound after the latter is injected. Frictional relationship between the plug tip and the surrounding compound will tend to prevent loosening of the plug during service. The general arrangement of ports and plugs shown in this figure is common throughout my structure, the ports being spaced at suitable intervals in all panels 14 and arranged longitudinally with grooves 17.

Figure 5:
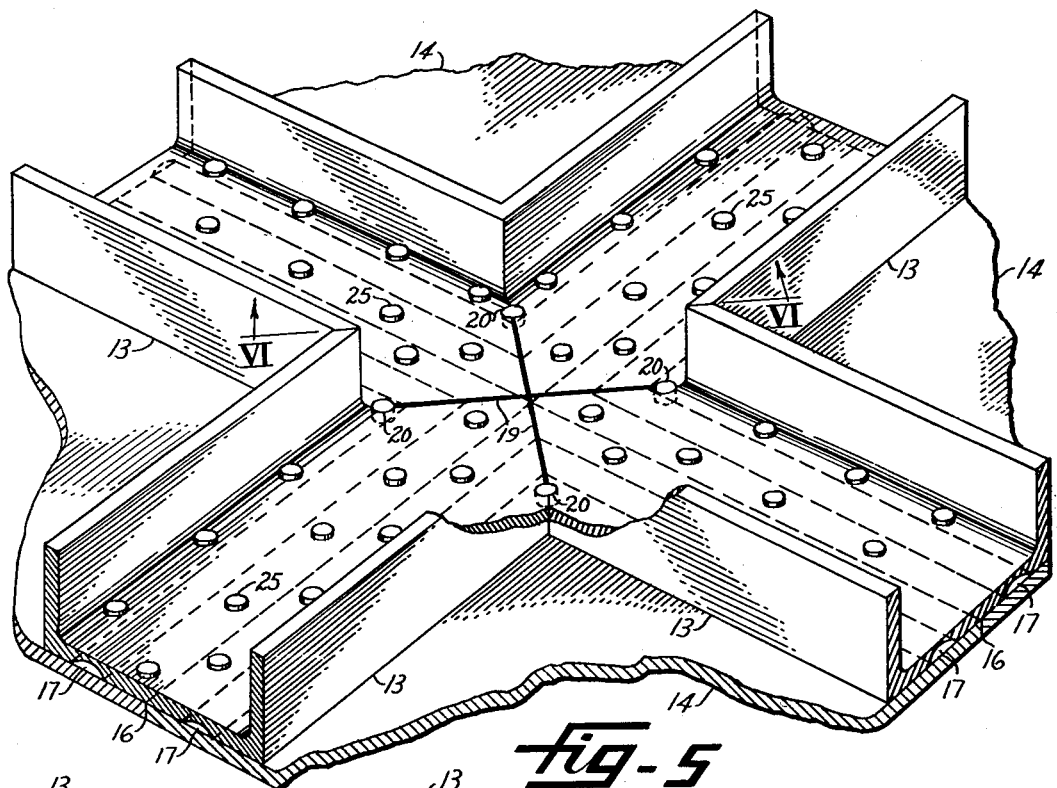
Figure 5 is an enlarged detail view of juncture B, shown partially in section, with a portion omitted for clarity.
Figure 6:
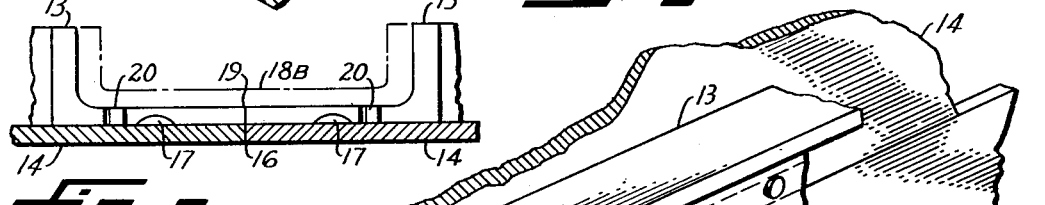
Figure 6 is a sectional view of Figure 5 taken along the line VI—VI.

Referring to Figure 5, juncture B is shown with the reinforcement member 18B omitted for clarity. Sealing grooves 17 are shown in dash lines, each groove of a given channel member 13 communicating with a corresponding groove in an intersecting channel member across a miter cut 19. The dam plugs 20 are shown positioned within the miter cuts 19, similarly to those shown and described in Figure 2, and are held securely between panels 14 and the reinforcement member 18B, as may be seen in Figure 6, the said member 18B being shown there in phantom lines.

Figure 7:
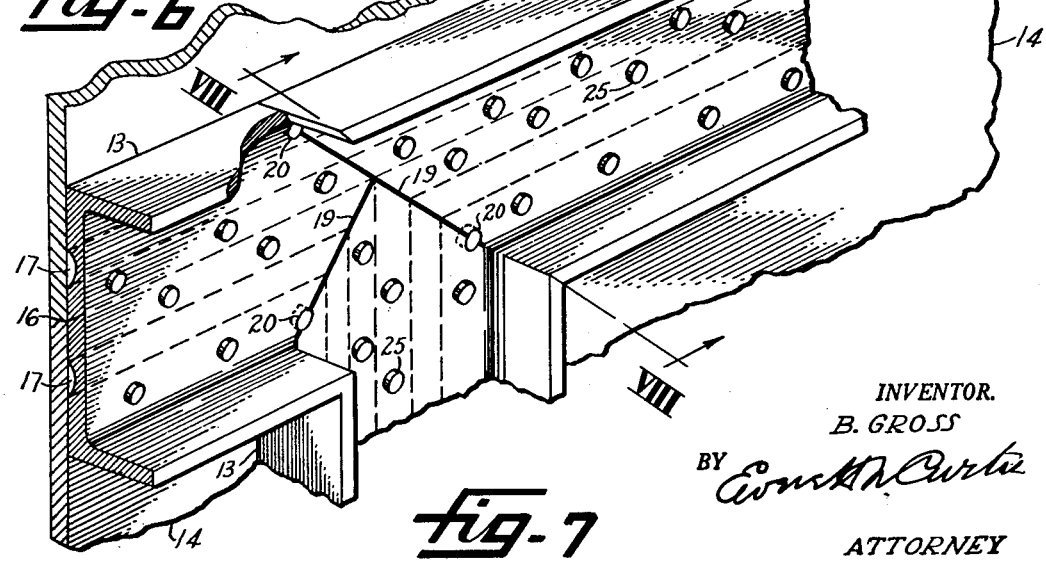
Figure 7 is an enlarged detail view of juncture C, shown partially in section, with a portion omitted for clarity.

Referring to Figure 7, juncture C is shown with the reinforcement member 18C omitted for clarity. Sealing grooves 17 are shown in dash lines, each groove of a given channel member 13 communicating with a corresponding groove in an intersecting channel member across a miter cut 19. The dam plugs 20 are shown positioned within the miter cuts 19, similarly to those shown and described in Figures 2 and 5, and are held securely between panels 14 and the reinforcement member 18C, as may be seen in Figure 8, the said member 18C being shown there in phantom lines.

Referring to Figure 9, juncture D is shown with the reinforcement member 18D omitted for clarity. Sealing grooves 17 are shown in dash lines, each groove of a given angle member 12 communicating with a corresponding groove in an intersecting channel member 13 across a miter cut 19. The dam plugs 20, are shown positioned within the miter cuts 19, similarly to those shown and described in Figures 2, 5 and 7, and are securely held between panels 14 and the reinforcement member 18D, as may be seen in Figure 10, the said member 18D being shown there in phantom lines.

Referring to Figure 11, the relationship between the seam 16 and sealing grooves 17 is identical to that shown in all other cases where channel members are concerned. The channel member 23 and panels 24 are modified to meet the requirements of structures involving curved surfaces and are shown fastened together by means of rivets 25. The rivets are sealed individually by means of a sealing device 26, disclosed in my earlier U. S. Patent No. 2,396,005 as mentioned previously herein. It may be seen that the rivets nearest the seam 16 are sealed on the inside of the structure, while those farthest from the seam are sealed on the outside. The necessity for this arrangement will appear obvious to those experienced, since a leak beginning at points X and Y will be blocked by the outside rivet seals and by the sealing compound in the adjacent groove 17, thus preventing leakage at the seam 16 or around the heads of the rivets nearest thereto. Likewise, the rivet seals installed inside the structure will prevent leakage through at points Z.

It is to be understood that the frame members may be of cross-sectional shapes other than those illustrated herein, provided such variations are adaptable to mitered joints allowing continuity of the sealing grooves as between individual members.

Also, the framework need not necessarily be on the inside of the structure, my pre-formed sealing grooves and general arrangement being reversible and completely adaptable to structures having an exterior framework.

It is also contemplated that in some installations it may be desirable to provide right angle flanges bent into the panel members themselves. In such cases a groove will be provided in one surface of each such flange, and the panels assembled in such a manner as to provide continuity of the grooves.

My invention may be embodied in other specific forms without departing from the spirit or essential characteristics thereof. The present embodiment, as herein set forth, is therefore to be considered in all respects as illustrative and not restrictive, the scope of my invention being indicated by the appended claims rather than by the foregoing description, and all changes which come within the meaning and range of equivalency of the claims are therefore intended to be embraced therein.

I am aware that prior to my invention, structures have been developed to utilize injection type sealing, and that injection type sealing is in itself old. However, such structures heretofore have not offered a practical network of sealing grooves having universal adaptability to structures of variously different shapes and configurations. In order to obtain continuity of the sealing grooves across intersections, existing structures require special machining and milling peculiar to the job at hand, often necessitating redesign for each new adaptation, with respect to the intercommunication of sealing grooves.

Having thus described my invention, what I claim as new and useful and desire to secure by Letters Patent is:

1. Means for supporting and individually sealing a portion of a hermetically sealable compartment comprising, in combination: a panel supporting framework composed of a plurality of long metallic frame members, each member having an outwardly facing panel-receiving face and one or more integral reinforcing flanges projecting into the compartment in a direction normal to said panel-receiving face, each frame member having a groove of substantial width in the panel-receiving face spaced from the edges of said face and extending longitudinally from end to end of the frame member, both ends of each frame member being beveled and the ends of contiguous frame members abutting together to form miter joints, the ends of adjacent grooves meeting at the miter joints to thereby provide a continuous sealant channel extending along the outer faces of all the frame members; a thin one piece metal panel constituting a portion of the wall of the compartment and having its edges disposed outwardly of said sealant channel, said panel and each of said frame members being provided with spaced apart holes outwardly of the sealant channel; headed fasteners having circular shanks passing through said holes and arranged to secure the inner face of said panel in firm contact with the grooved faces of said frame members to provide a continuous closure cover for said sealant channel; a plurality of spaced apart injection ports terminating in the groove of each frame member, each of said ports being arranged to permit passage of plastic sealant material under pressure into the sealant channel and a member disposed in each miter joint inwardly of said sealant channel and in contact with said metal panel, said member being constructed to block the passage of sealant material from the sealant channel inwardly along the miter joint.

2. A compartment structure as claimed in claim 1, in which the member disposed in each miter joint is a cylindrical plug having a length equal to the thickness of said frame members.

References Cited in the file of this patent

UNITED STATES PATENTS

| | | |
|---|---|---|
| Re. 17,667 | Mersfelder et al. | May 13, 1930 |
| Re. 21,524 | Gramelspacher | Aug. 6, 1940 |
| 935,376 | Lennon | Sept. 28, 1909 |
| 1,805,812 | DeWitt | May 19, 1931 |
| 2,071,809 | Anderson | Feb. 23, 1937 |
| 2,228,779 | Pavlecka et al. | Jan. 14, 1941 |
| 2,481,357 | Smith et al. | Sept. 6, 1949 |
| 2,501,313 | Carter | Mar. 21, 1950 |
| 2,505,544 | Higgins | Apr. 25, 1950 |

FOREIGN PATENTS

| | | |
|---|---|---|
| 697,244 | France | 1931 |